US007094098B2

(12) United States Patent
Miyazaki

(10) Patent No.: US 7,094,098 B2
(45) Date of Patent: Aug. 22, 2006

(54) CONNECTOR FOR APPARATUS

(75) Inventor: Sho Miyazaki, Yokkaichi (JP)

(73) Assignees: Autonetworks Technologies, Ltd., Mie (JP); Sumitomo Wiring Systems, Ltd., Mie (JP); Sumitomo Electric Industries, Ltd., Osaka (JP)

(*) Notice: Subject to any disclaimer, the term of this patent is extended or adjusted under 35 U.S.C. 154(b) by 0 days.

(21) Appl. No.: 10/873,123

(22) Filed: Jun. 23, 2004

(65) Prior Publication Data

US 2004/0266269 A1 Dec. 30, 2004

(30) Foreign Application Priority Data

Jun. 26, 2003 (JP) ............................. 2003-182207

(51) Int. Cl.
*H01R 13/73* (2006.01)
*H02B 1/01* (2006.01)

(52) U.S. Cl. ...................... 439/559; 439/948; 439/682; 439/550; 439/891; 439/709

(58) Field of Classification Search ................ 439/559, 439/948, 682, 556, 544, 550, 891, 362, 709
See application file for complete search history.

(56) References Cited

U.S. PATENT DOCUMENTS 3,022,484 A * 2/1962 Thompson, Jr ............. 439/550
5,417,587 A * 5/1995 Katsuda et al. ............. 439/559
6,338,651 B1 * 1/2002 Svette et al. ................ 439/559

FOREIGN PATENT DOCUMENTS

JP A-2002-125348 4/2002

* cited by examiner

*Primary Examiner*—Javaid H. Nasri
(74) *Attorney, Agent, or Firm*—Olif & Berridge PLC

(57) ABSTRACT

Connection and disconnection between an apparatus and an electric wire are made by fitting an electric wire side housing in an apparatus side housing inside a mounting hole or removing the electric wire side housing from the apparatus side housing, so that the need for time-consuming work for tightening or loosening a bolt or work for attaching a cover to a terminal block or detaching the cover from the terminal block as is conventional is eliminated and workability is good. In addition, the apparatus side housing can be fixed into the mounting hole by a stopper and a retainer, so that workability is good as compared with the case of fixing the apparatus side housing by bolt tightening.

5 Claims, 13 Drawing Sheets

CONNECTOR FOR APPARATUS

BACKGROUND OF THE INVENTION

1. Field of the Invention

The present invention relates to a connector for an apparatus.

2. Description of the Related Art

As a connector for an apparatus for connecting an electric wire to an apparatus such as a motor of an electric vehicle, there is a structure in which the distal end of an electric wire is held by a housing and the housing is fixed in a case of an apparatus and also the electric wire is made to penetrate a mounting hole of the case and an electric wire side terminal fastened in the distal end of the electric wire is connected to an apparatus side terminal inside the case.

Connection between the terminals is made by bolt tightening, but in order to enable this bolt tightening work, it is configured so that the case is provided with a terminal block for exposing the apparatus side terminal to the outside of the case and after the bolt tightening is completed, the terminal block is coated with a cover and a connection portion of the terminals is enveloped (for example, see JP-A-2002-125348).

In the conventional connector for apparatus, when the electric wire is connected to or disconnected from the apparatus, time-consuming work for tightening or loosening the bolt and work for attaching the cover to the terminal block or detaching the cover from the terminal block are required, so that workability in the case of connecting and disconnecting the electric wire for maintenance etc. is not good.

SUMMARY OF THE INVENTION

The invention of the present application is devised in view of the circumstances described above. It is an object of the invention to improve workability in the case that an electric wire is connected to or disconnected from an apparatus.

According to one aspect of the invention, a connector for apparatus including: an apparatus case having a mounting hole and a stopper; an apparatus side housing inserted into the mounting hole of the apparatus case, and holding at least one apparatus side terminals; and an electric wire side housing capable of being fitted in or removed from the apparatus side housing, and holding at least one electric wire side terminals fastened to an distal end of an electric wire, wherein the at least one electric wire side terminals is capable of being connected to or disconnected from the at least one apparatus side terminals by fitting or removing the electric wire side housing from the apparatus side housing, the apparatus side housing is forward stopped by abutting the apparatus side housing on the stopper of the apparatus side housing, and the apparatus side housing is retained by engaging and stopping a retainer fitted in the apparatus side housing in the apparatus case.

By the above-construction, connection and disconnection between an apparatus and an electric wire are made by fitting an electric wire side housing in an apparatus side housing inside a mounting hole or removing the electric wire side housing from the apparatus side housing, so that the need for time-consuming work for tightening or loosening a bolt or work for attaching a cover to a terminal block or detaching the cover from the terminal block as is conventional is eliminated and workability is good.

In addition, the apparatus side housing can be fixed into the mounting hole by a stopper and a retainer, so that workability is good as compared with the case of fixing the apparatus side housing by bolt tightening.

According to another aspect of the invention, the retainer has a partition part which partitions a portion between regions exposed to an outside of the apparatus side housing among a plurality of the parallel apparatus side terminals.

By a partition part, creepage distance between apparatus side terminals is ensured and leakage between the apparatus side terminals can be prevented.

According to another aspect of the invention, at least one apparatus direct connection terminals which is directly connected to an apparatus main body inside the apparatus case is connected to the at least one apparatus side terminals by bolt tightening, and the retainer has at least one guide part which guides a jig of the bolt tightening to a bolt tightening part formed in the at least one apparatus side terminals.

By the above-construction, a jig for bolt tightening is guided to a bolt tightening part of apparatus side terminals by a guide part, so that workability of bolt tightening is good.

According to another aspect of the invention, at least one apparatus direct connection terminals which is directly connected to an apparatus main body inside the apparatus case is connected to the at least one apparatus side terminals by bolt tightening, and the retainer has at least one rotation stop part which pinches the at least one apparatus direct connection terminals from both sides of the at least one rotation stop part.

Thus, apparatus direct connection terminals are pinched by a rotation stop part, so that the apparatus direct connection terminals can be prevented from dragging in the case of bolt tightening.

According to another aspect of the invention, at least one apparatus direct connection terminals is directly connected to an apparatus main body inside the apparatus case, the at least one apparatus side terminals is connected to the at least one apparatus direct connection terminals by bolt tightening, the at least one apparatus direct connection terminals is displaceable relatively to the apparatus case, clearance which allows the apparatus side housing to be displaced relatively inside the mounting hole is provided between the apparatus side housing and an inner circumference of the mounting hole, and clearance which allows the apparatus side housing to be displaced relatively to the apparatus case is provided at least between the retainer and the apparatus side housing and between the retainer and the apparatus case.

For example, in the case that an apparatus side housing is fixed in a case when apparatus direct connection terminals and apparatus side terminals are displaced relatively to the case due to vibration, there is a fear of increase or concentration of stress in a portion of abutment on an inner circumference of a mounting hole or a holding portion of the apparatus side terminals in the apparatus side housing. However, according to the invention, the apparatus side housing can be displaced relatively to the case integrally with the apparatus side terminals and the apparatus direct connection terminals, so that increase or concentration of stress in the apparatus side housing is avoided.

BRIEF DESCRIPTION OF THE DRAWINGS

These and other objects and advantages of this invention will become more fully apparent from the following detailed description taken with the accompanying drawings in which.

DESCRIPTION OF THE PREFERRED EMBODIMENTS

Figure 1:
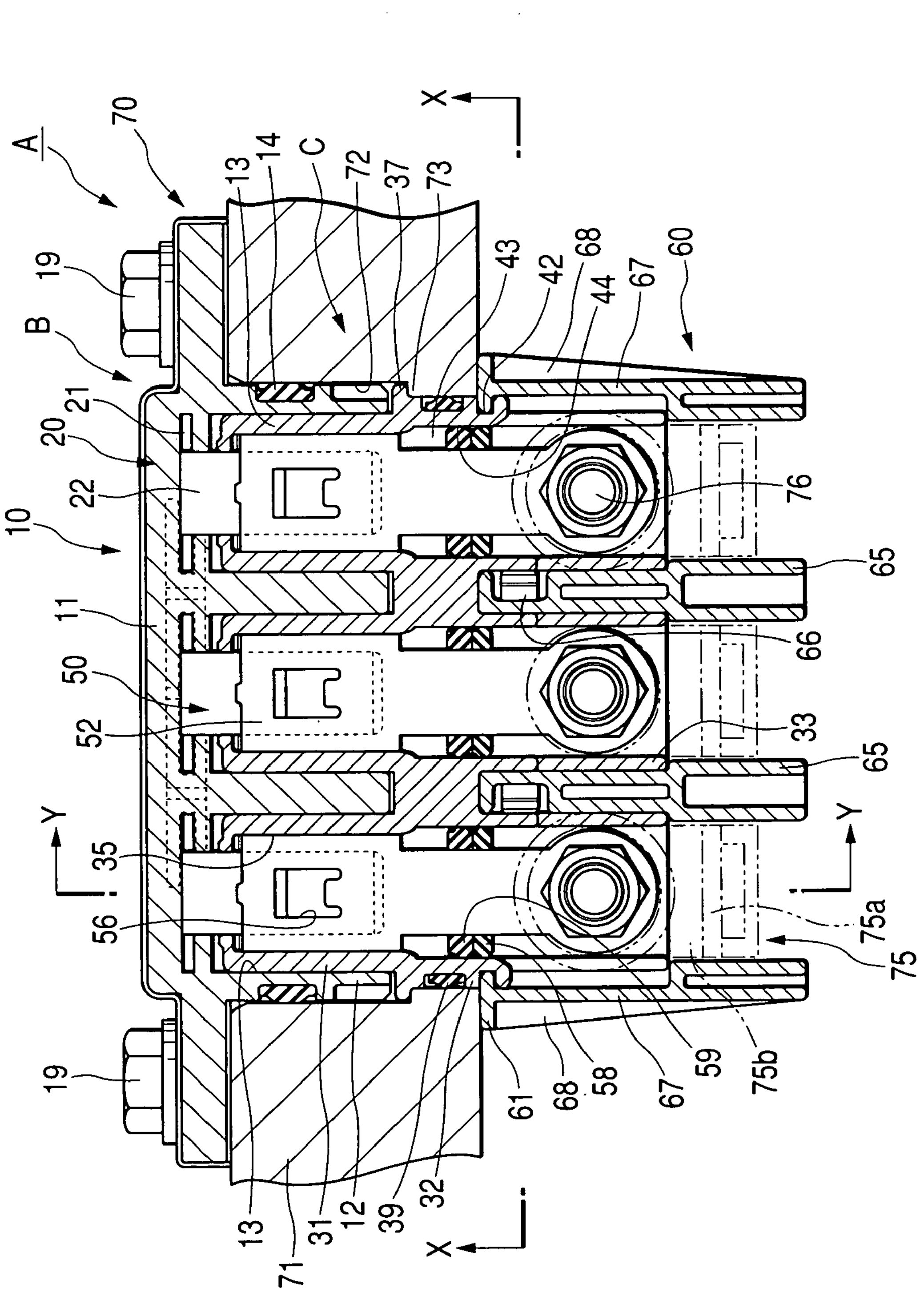
FIG. 1 is a sectional view showing a state in which a connector for apparatus is mounted in a shielding case.
Figure 2:
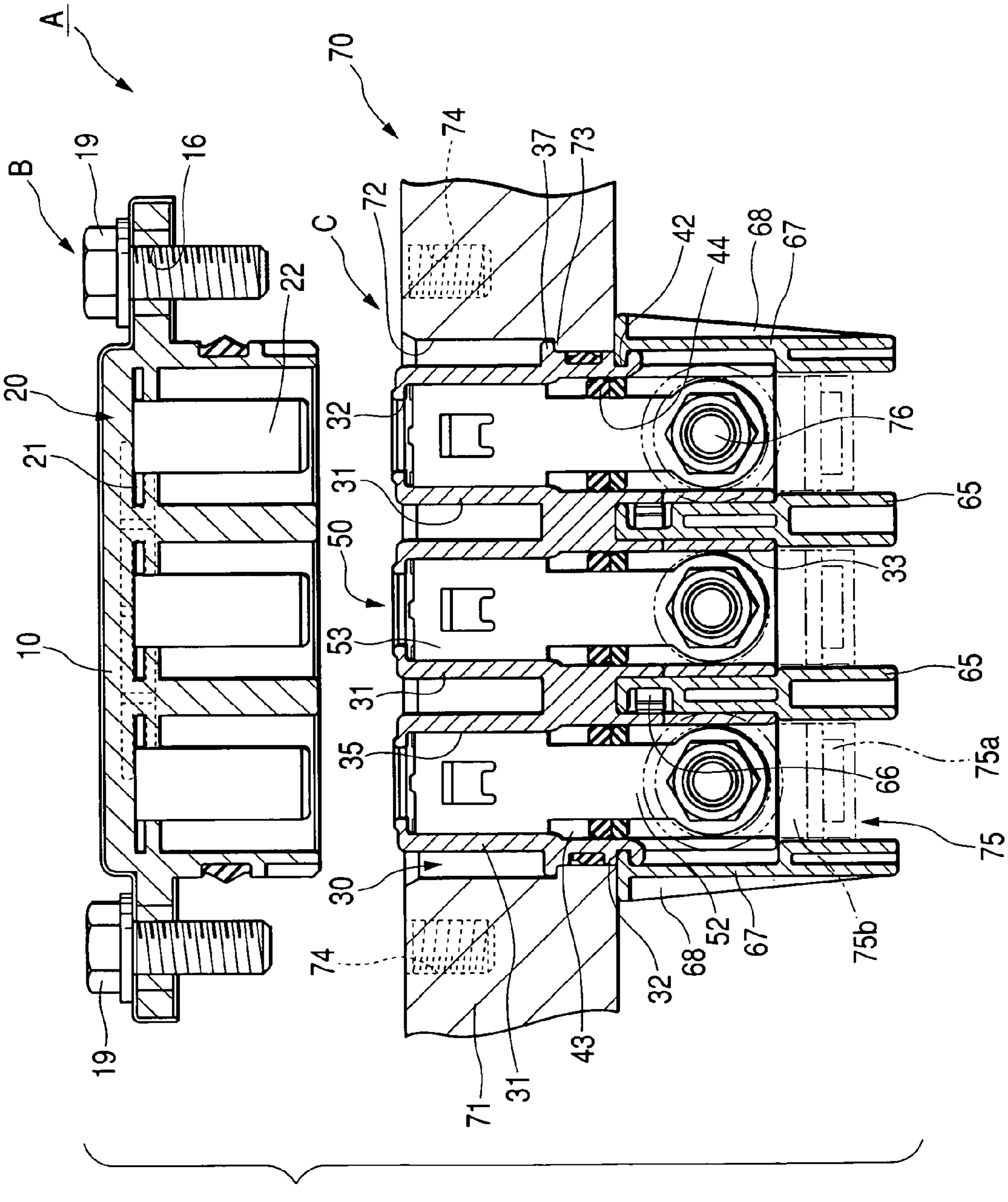
FIG. 2 is a sectional view showing a state in which an electric wire side connector is disconnected from an apparatus side connector in FIG. 1.
Figure 3:
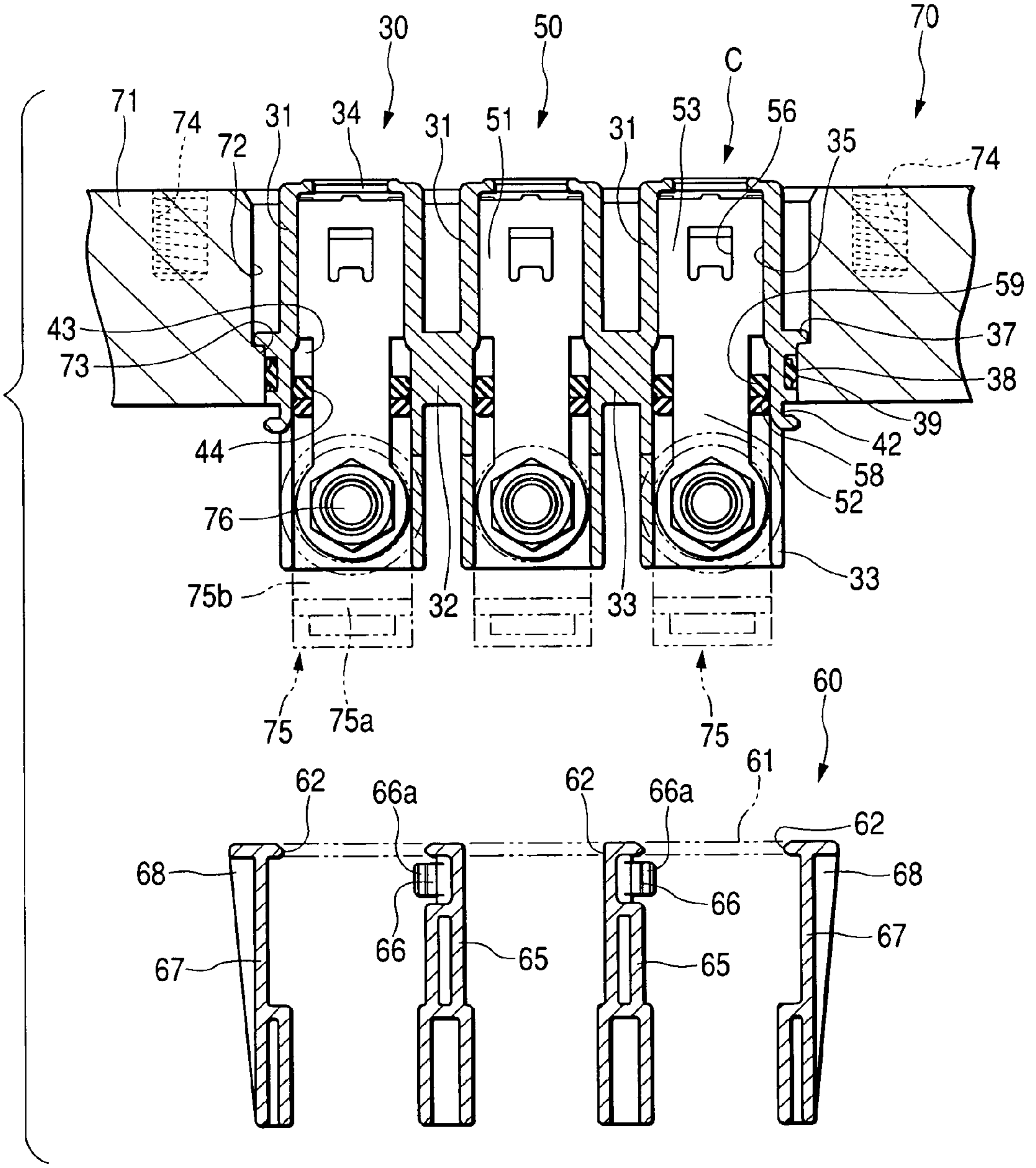
FIG. 3 is a sectional view showing a state in which a retainer is disconnected from the apparatus side connector in FIG. 2.
Figure 4:
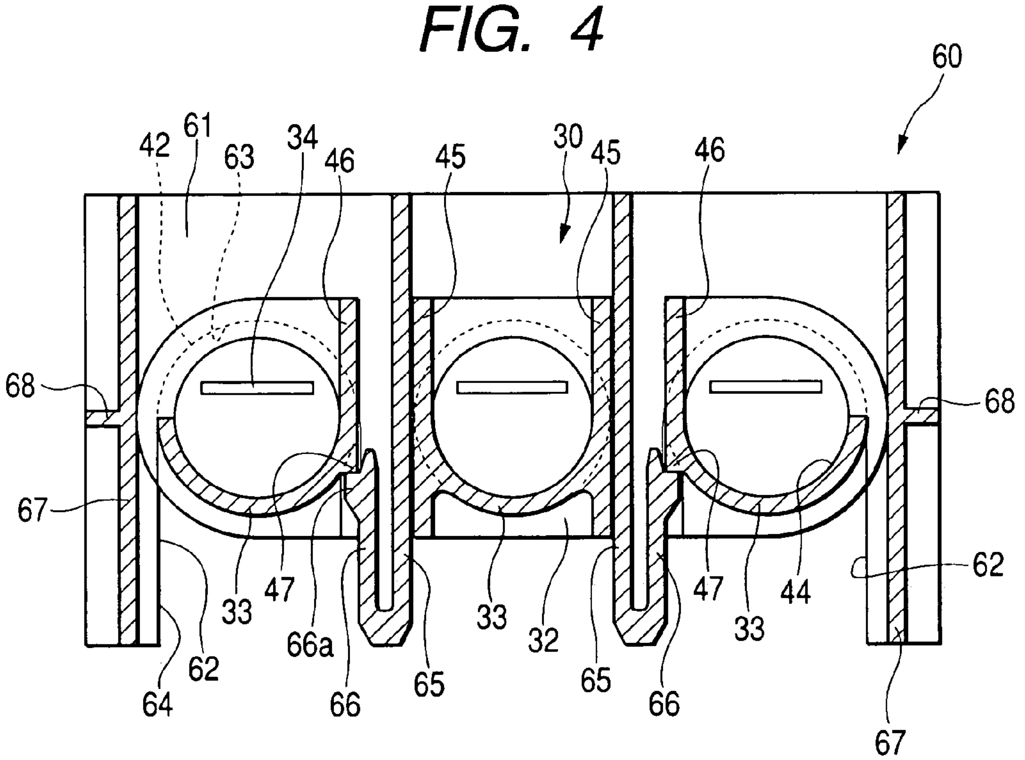
FIG. 4 is a sectional view taken on line X—X of FIG. 1.
Figure 5:
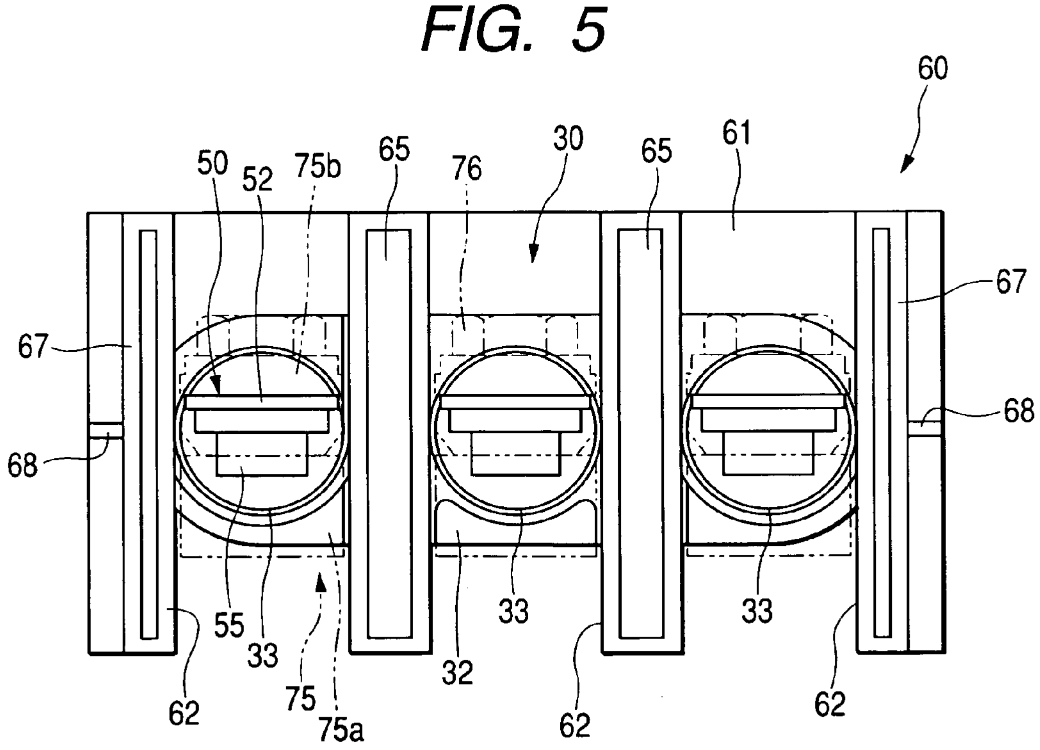
FIG. 5 is a bottom view of a state of assembling the apparatus side connector and the retainer.
Figure 6:
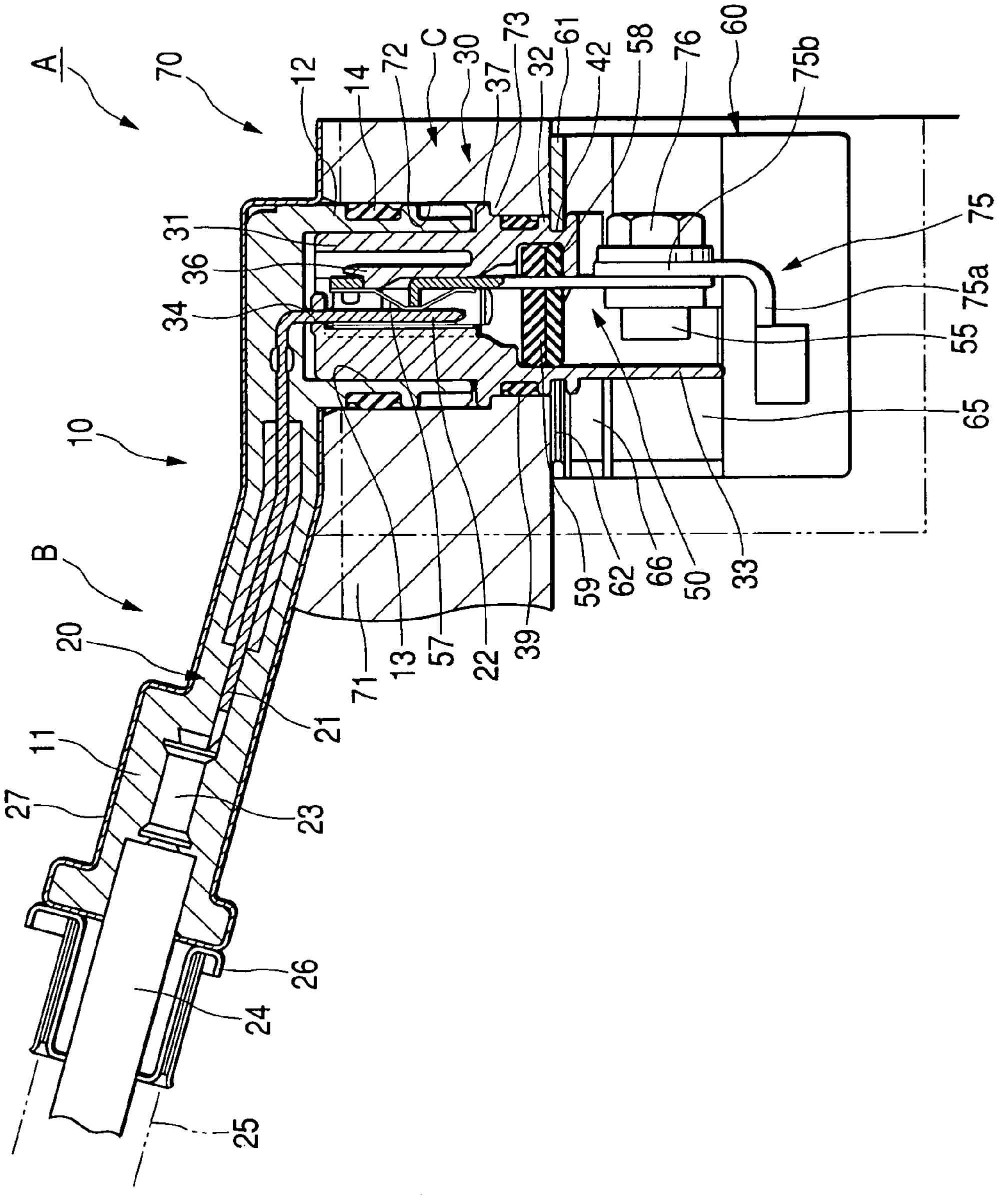
FIG. 6 is a sectional view taken on line Y—Y of FIG. 1.
Figure 7:
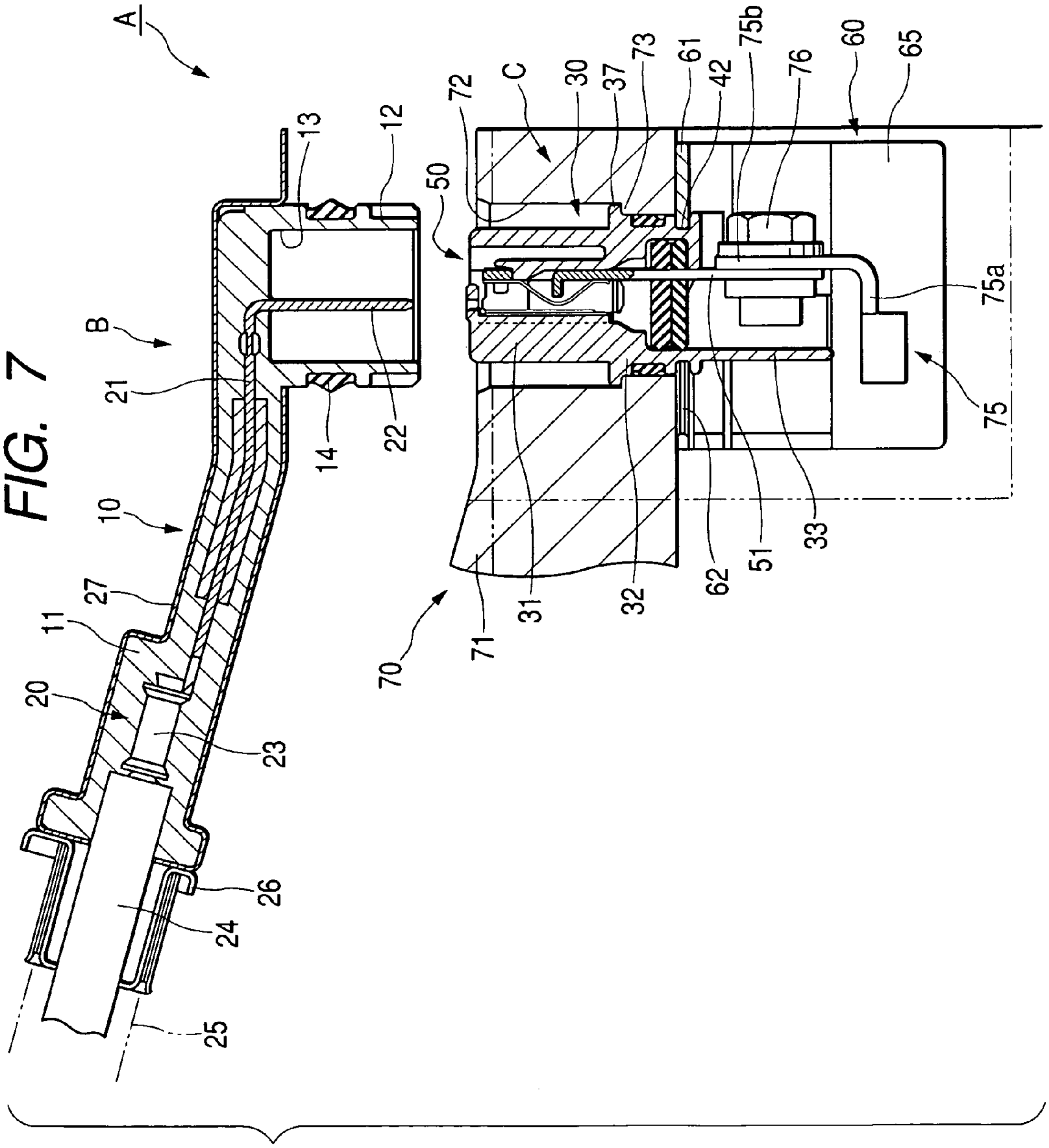
FIG. 7 is a sectional view showing a state of disconnecting the electric wire side connector in FIG. 6.
Figure 8:
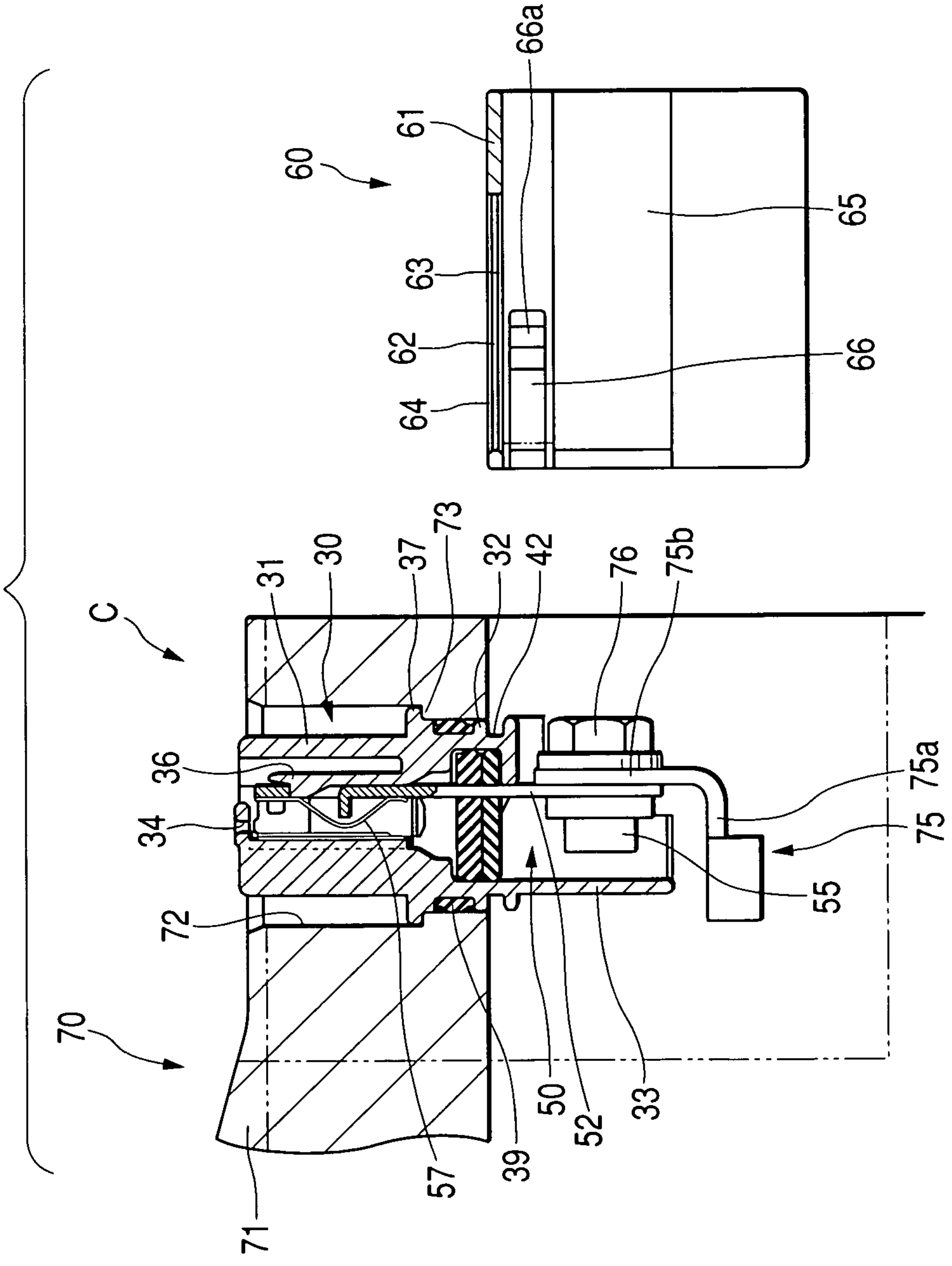
FIG. 8 is a sectional view showing a state in which the retainer is disconnected from the apparatus side connector in FIG. 7.
Figure 9:
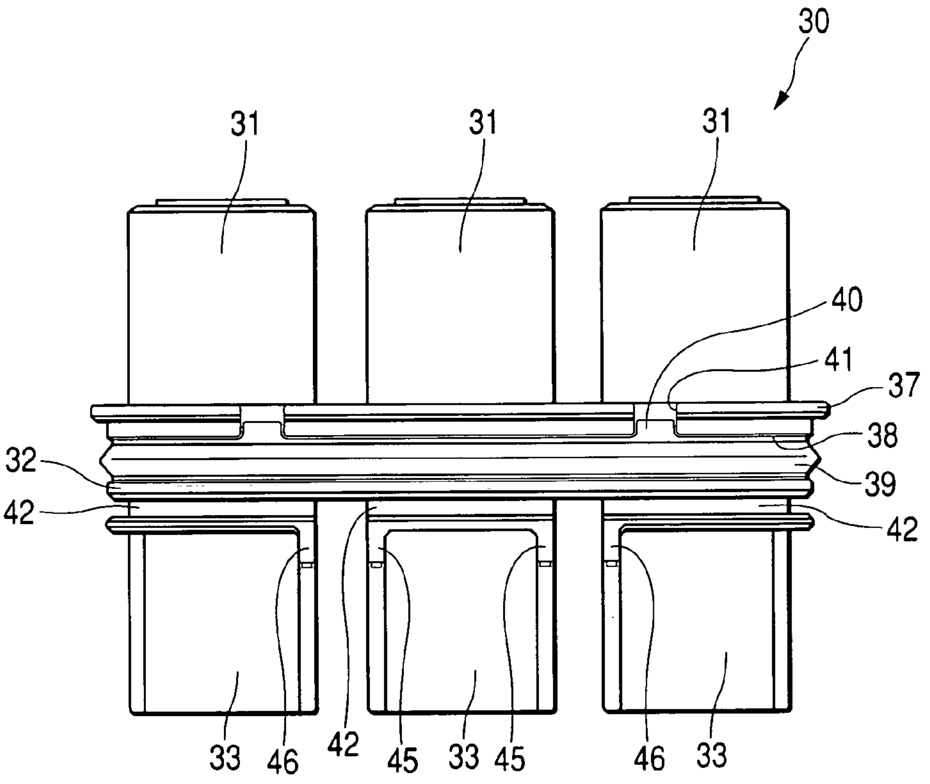
FIG. 9 is a rear view of an apparatus side housing.
Figure 10:
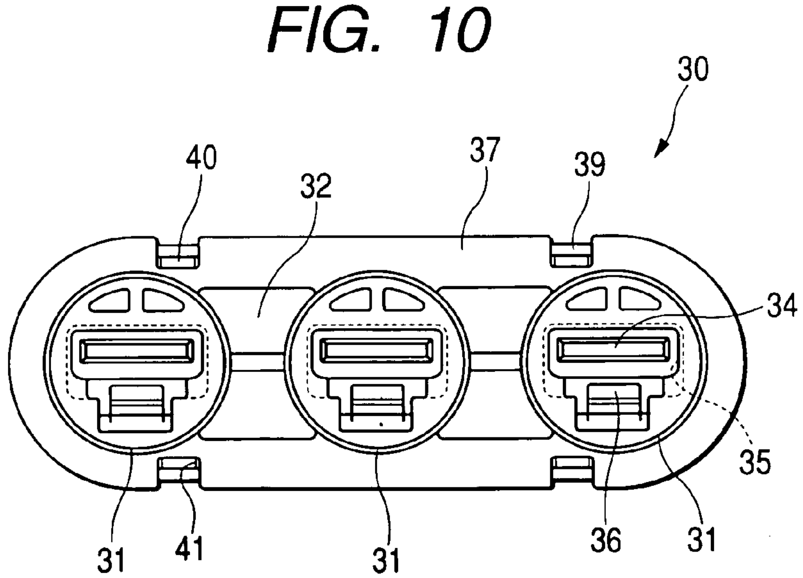
FIG. 10 is a plan view of the apparatus side housing.
Figure 11:
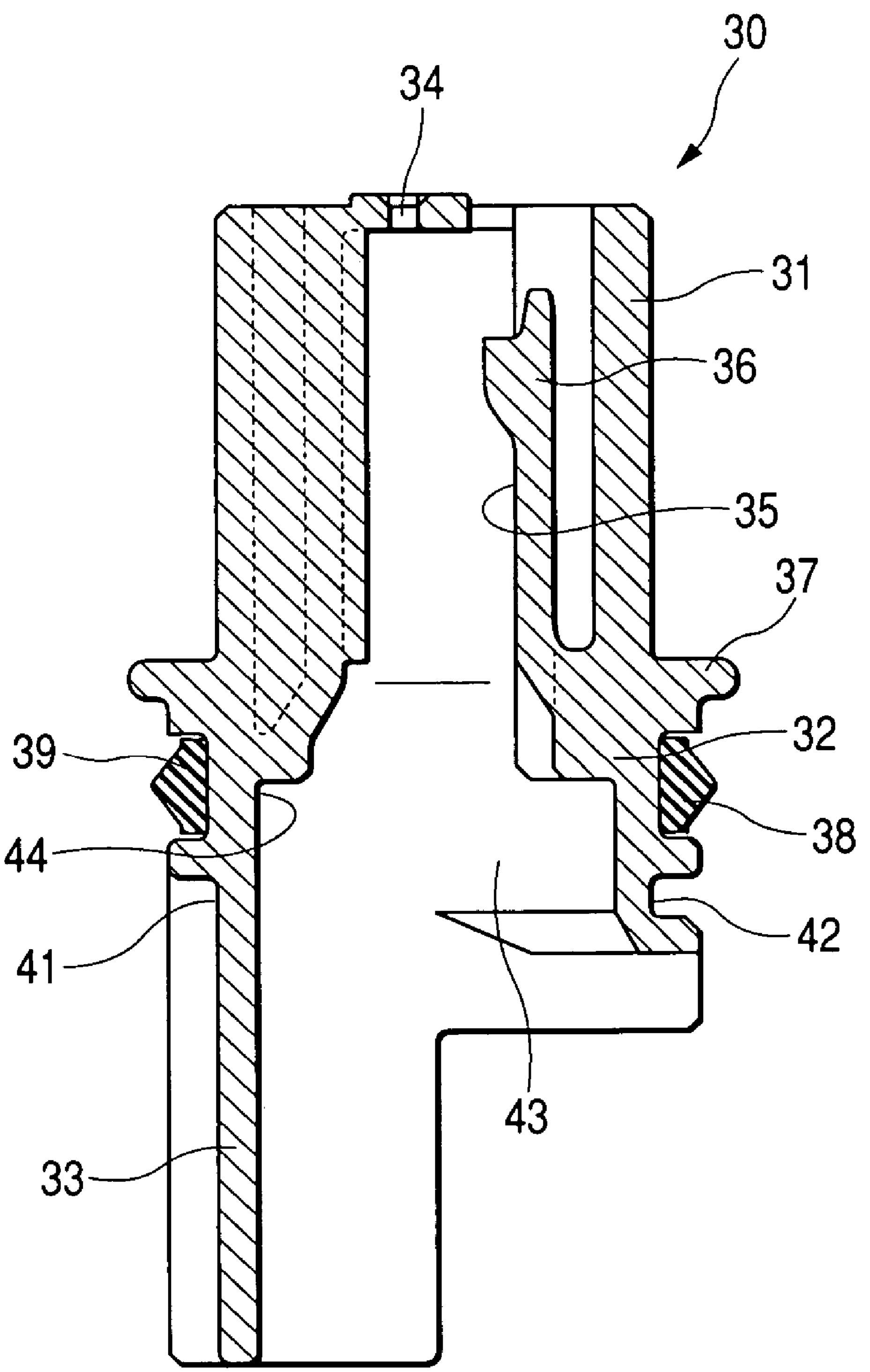
FIG. 11 is a sectional view of the apparatus side housing.

Embodiments of the invention will be described below with reference to FIGS. 1 to 18.

First, an apparatus 70 in which a connector A for apparatus of the present embodiment is mounted will be described. The apparatus 70 (for example, an inverter, a motor of an electric vehicle) accommodates an apparatus body which is not shown (for example, a stator of a motor) in a shielding case 71 (a case which is a configuration requirement of the invention), and a mounting hole 72 vertically penetrated so as to communicate the inside and the outside of the shielding case 71 is formed in an upper surface of the shielding case 71. The mounting hole 72 is formed in horizontally elongated ellipse shape and in the lower end in its inner circumference, a stopper 73 of a form with a figure (that is, ellipse shape) similar to that of the mounting hole 72 and a contracted diameter smaller than that of the mounting hole 72 by one size is formed continuously over the entire circumference. Also, female threaded holes 74 in which axis lines are vertically set are formed in both sides of the right and left of the mounting hole 72 in the upper surface (outer surface) of the shielding case 71. Further, inside the shielding case 71, three apparatus direct connection terminals 75 directly connected to the apparatus body are aligned at horizontally regular pitches. The apparatus direct connection terminal 75 is made of a bus bar bent so that a plate surface of a thick-walled metal plate material achieves a substantially right angle and also is formed in L shape when viewed from the side. A horizontal part 75*a* of the apparatus direct connection terminal 75 is supported by the apparatus body and a vertical part 75*b* standing from the front end of the horizontal part 75*a* is located substantially just under the mounting hole 72. A bolt hole (not shown) penetrated backward and forward is formed in this vertical part 75*b*. The bolt hole connects to an apparatus side terminal 50.

Next, the connector A for apparatus of the present embodiment will be described.

The connector A for apparatus includes an electric wire side connector B connected to the distal end of an electric wire 24 constructing a wire harness, and an apparatus side connector C for receiving inside the mounting hole 72 of the shielding case 71.

The electric wire side connector B holds three electric wire side terminals 20 in an electric wire side housing 10 made of synthetic resin, and the electric wire side housing 10 is integrated with the electric wire side terminals 20 by insert molding. The electric wire side housing 10 is obtained by integrally molding a housing body 11 which is flat as a whole and is formed in the shape in which the back end side portion is inclined toward the lower front and an elliptic fitting part 12 for downward protruding from a horizontal front end of this housing body 11, and the housing body 11 is mounted so as to make close contact with the upper surface of the shielding case 71 and the fitting part 12 is constructed so as to be fitted into the mounting hole 72. Three fitting recess parts 13 with the opened lower end surface and also circular shape in which an axis line is vertically set are formed inside the fitting part 12, and a seal ring 14 with ellipse shape is attached to an outer circumference of the fitting part 12.

The electric wire side terminal 20 is obtained by bending a metal plate material, and includes a terminal body 21 placed inside the housing body 11 in elongated shape backward and forward, a tab-shaped male connection part 22 downward extending from the front end of this terminal body 21 and a crimp part 23 with open barrel shape formed in the back end of the terminal body 21. The male connection part 22 is accommodated in each the fitting recess part 13. An electric wire 24 is connected to the crimp part 23 by crimping and the electric wire 24 is backward led out of a back end surface of the housing body 11.

The three electric wires 24 led out of the housing body 11 are shielded by being collectively surrounded by a shielding member 25 with flat tubular shape made of a woven wire. The distal end of the shielding member 25 is connected to a shielding tube 26, and the shielding tube 26 is connected to a shielding shell 27 attached so as to make close contact with the outside (except for the fitting part 12) with respect to the electric wire side housing 10. Bolt holes (not shown) which are vertically penetrated and also are aligned with the female threaded holes 74 of the shielding case 71 and bolt holes 16 of the electric wire side housing 10 by the electric wires 24 are formed in right and left positions of both ends in the front end of the shielding shell 27.

Next, the apparatus side connector C will be described. The apparatus side connector C holds three apparatus side terminals 50 in an apparatus side housing 30 made of synthetic resin, and is fixed in the mounting hole 72 by a retainer 60 made of synthetic resin.

The apparatus side housing 30 is obtained by integrally molding three right and left cylinder parts 31 in which axis lines are vertically set, an elliptic joint part 32 for mutually joining the lower ends of the cylinder parts 31, and three right and left semi cylinder-shaped arc walls 33 which downward extend from the joint part 32 and also are placed so as to correspond to each of the cylinder parts 31.

An outside diameter of the cylinder part 31 is set to the same dimension as an inside diameter of the fitting recess part 13 of the electric wire side housing 10, and a slit-shaped insertion opening 34 for moving the male connection part 22 of the electric wire side terminal 20 into the cylinder part 31 is formed in an upper surface wall of the cylinder part 31. Also, the inside of each the cylinder part 31 has a cavity 35 with a rectangular cross section and this cavity 35 is provided with a lance 36 which enables elastic flexure in backward and forward directions and has a form upward protruding from a position forward decentered from the axis center of the cylinder part 31 in the joint part 32.

The joint part 32 is configured so as to fit in an inner circumference of the stopper 73 with ellipse shape formed in the lower end of the mounting hole 72, and an engagement stop rib 37 extending in a circumferential direction is formed in the upper end of an outer circumference of the joint part 32. Also, a circumferential seal groove 38 is formed in the lower portion from the engagement stop rib 37 in the outer circumference of the joint part 32, and a seal ring 39 is attached to this seal groove 38. Incidentally, a positioning protrusion 40 protruding in an upward direction is formed in the seal ring 39 and by engaging and stopping this positioning protrusion 40 in a positioning recess part 41, the seal ring 39 is positioned in a circumferential direction and also free movement in the circumferential direction is regulated. Also, three mounting grooves 42 with a semicircle concentric with each the cylinder part 31 are formed in a front region of the outer circumference of the joint part 32 which engages and stops the retainer 60. Communication space 43 for communicating with the cavity 35 of the cylinder part 31 is formed inside the joint part 32. A seal surface 44 with a circle concentric with the cylinder part 31 is formed in an inner circumference of the communication space 43.

The arc wall 33 is placed concentrically with each the cylinder part 31 and also is formed in a direction opened in the front and lower portions. A curvature radius of an inner circumferential surface of the arc wall 33 is set to the same dimension as a radius of the seal surface 44 of the joint part 32. That is, the inner circumferential surface of the arc wall 33 is continuous flush with the seal surface 44. Also, a pair of right and left guide walls 45 straightly extending from the upper end in both the right and left edges to the front and the back are formed in the central arc wall 33 of the three arc walls 33. This guide wall 45 extends along a lower surface of the joint part 32 and also is formed in an elongated rectangle in backward and forward directions, and an inner surface of the guide wall 45 is continuous smoothly with the inner circumference of the arc wall 33. Also, a front end surface and a back end surface of this guide wall 45 are formed flush with the outer circumference of the joint part 32. On the other hand, auxiliary walls 46 straightly extending from the upper end in the edge near to the center to the front in parallel with the guide wall 45 are formed in the arc walls 33 located in both the right and left sides. In a manner similar to the guide wall 45, the auxiliary wall 46 also extends along a lower surface of the joint part 32 and also is formed in an elongated rectangle in backward and forward directions, and an inner surface of the auxiliary wall 46 is continuous smoothly with the inner circumference of the arc wall 33, and a front end surface of the auxiliary wall 46 is formed flush with the outer circumference of the joint part 32. Also, a back end surface of this auxiliary wall 46 has a stepped-shaped retaining part 47 for retaining the retainer 60.

The apparatus side terminal 50 is constructed by assembling a terminal body 51 made of a thick-walled plate material and an elastic contact segment 57 with a wall thickness thinner than that of the terminal body 51. The terminal body 51 includes a vertically elongated board 52 with a direction in which a board thickness is backward and forward directions and a female connection part 53 formed in the upper end of this board 52, and a circular hole 54 penetrated in backward and forward directions is formed in the lower end of the board 52 and in this circular hole 54, a female thread body 55 is fixed in a form protruding to the back side of the board 52. The female connection part 53 is formed in rectangular cylinder shape penetrated vertically and a front wall of this female connection part 53 is continuous flush with the board 52. Also, a lance hole 56 engaged and stopped in the lance 36 of the cylinder part 31 is formed in the front wall of the female connection part 53. On the other hand, the elastic contact segment 57 is formed in the shape which is vertically elongated as a whole and is bent when viewed from the side, and is mounted in a state accommodated inside the female connection part 53 by engaging and stopping the upper end of the elastic contact segment 57 in the female connection part 53.

A disk-shaped spacer 58 in which an axis line is vertically set and a seal member 59 with disk shape concentric with the spacer 58 are attached to the board 52 of such an apparatus side terminal 50. An outside diameter of the spacer 58 is set to the same dimension as an inside diameter of the seal surface 44 of the apparatus side housing 30, and an outside diameter in a state in which elastic flexure of the seal member 59 is not caused is set to a dimension larger than the inside diameter of the seal surface 44. This spacer 58 and the seal member 59 are integrated with the board 52 by mold forming. Mold forming of the spacer 58 and mold forming of the seal member 59 are performed as a separate process and any of the mold forming may be performed ahead. By performing the mold forming thus, it is configured so that the seal member 59 makes close contact with an upper surface of the spacer 58.

Figure 12:
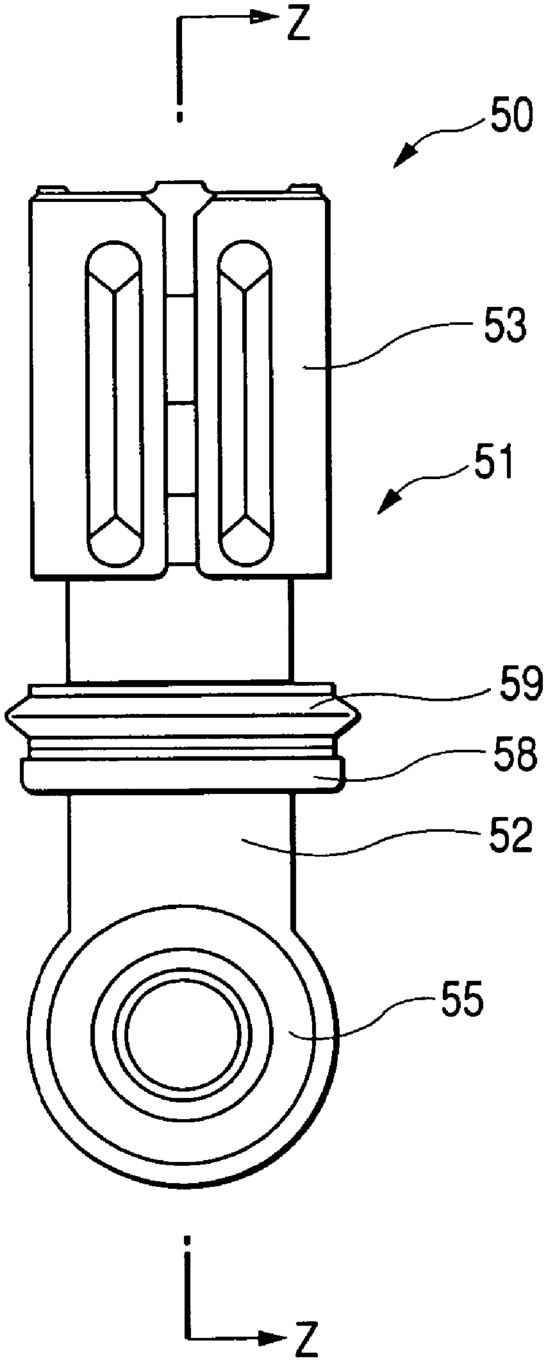
FIG. 12 is a rear view of an apparatus side terminal.
Figure 13:
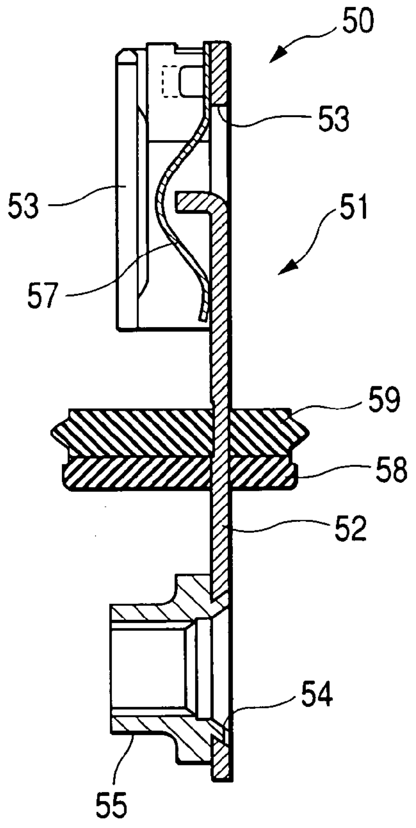
FIG. 13 is a sectional view taken on line Z—Z of FIG. 12.
Figure 14:
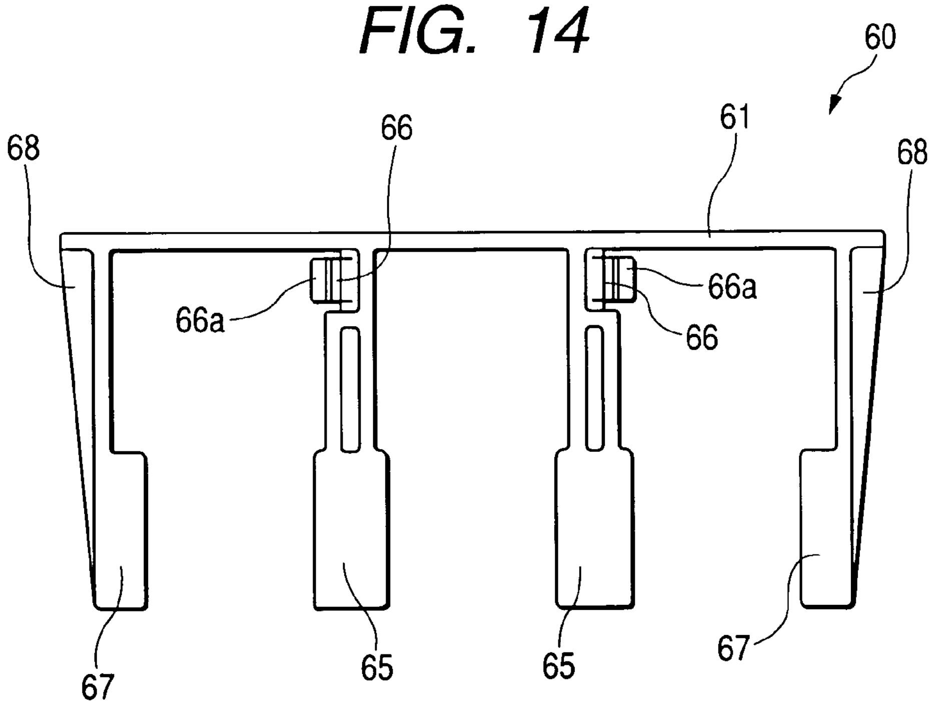
FIG. 14 is a front view of the retainer.
Figure 15:
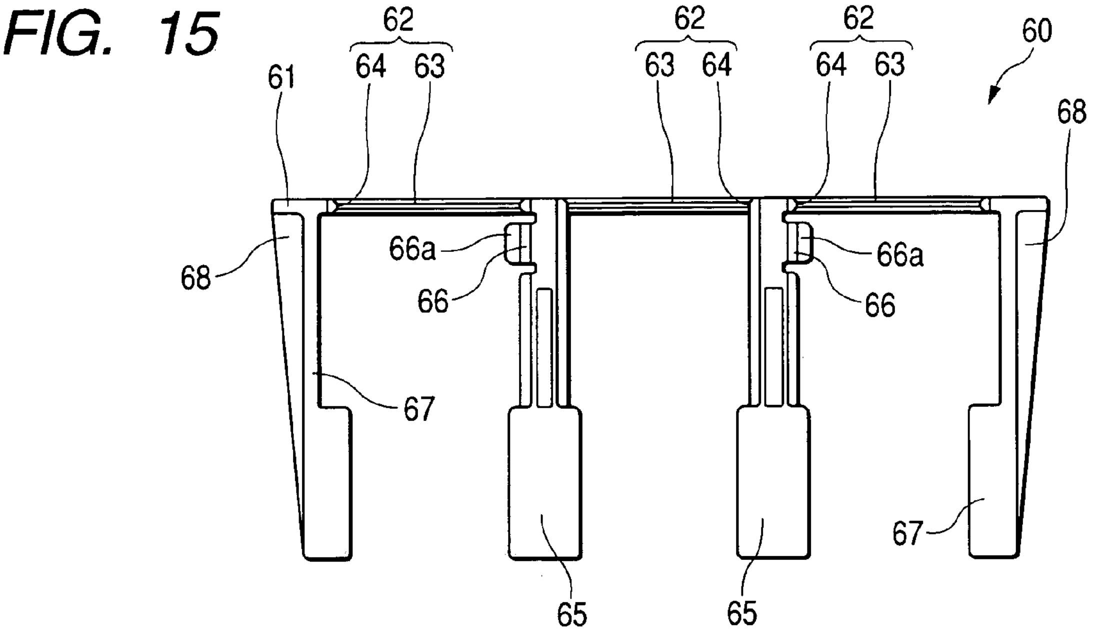
FIG. 15 is a rear view of the retainer.
Figure 16:
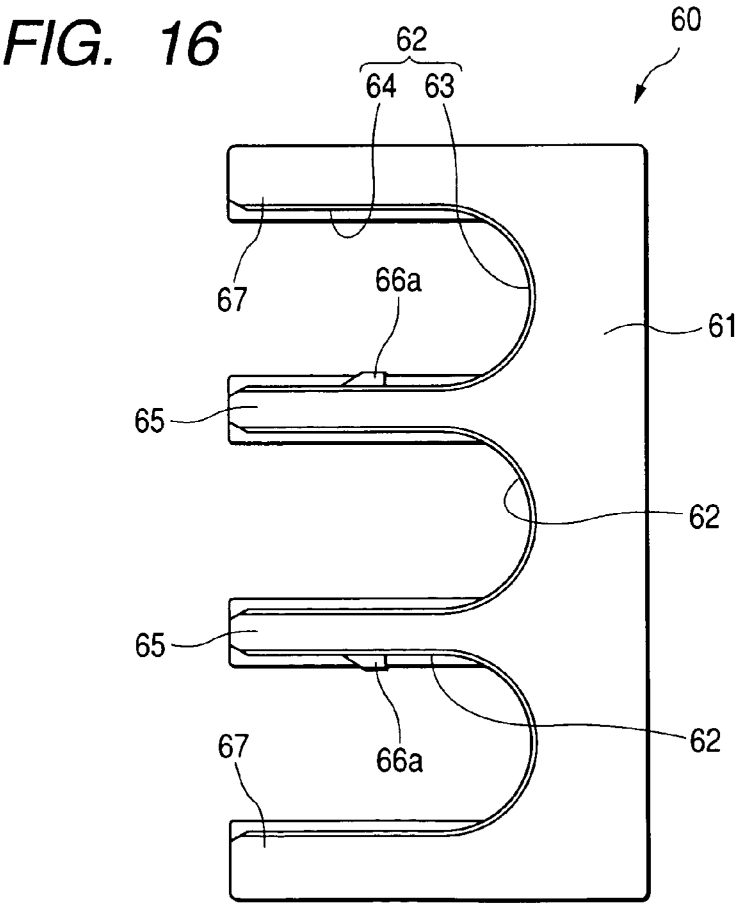
FIG. 16 is a plan view of the retainer.
Figure 17:
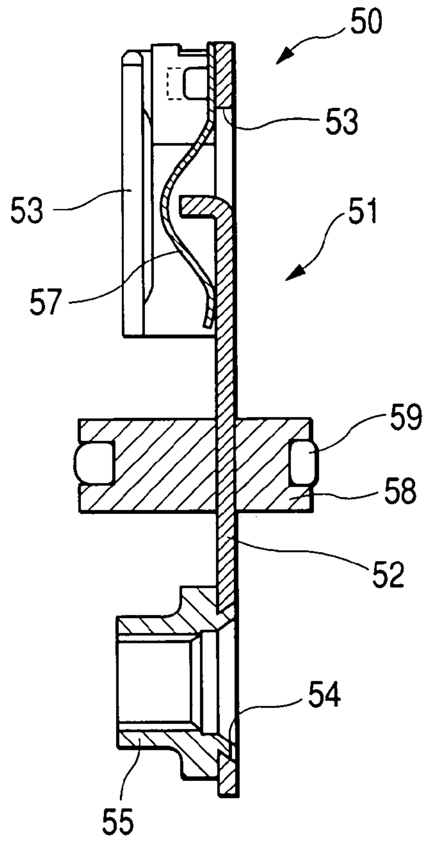
FIG. 17 is a sectional view taken on line Z—Z of FIG. 12 in another example.

FIG. 17 shows a sectional view taken on line Z—Z of FIG. 12 in another example. A spacer 58 is attached to the board 52 of the apparatus side terminal 50 by an adhesive member. A recessed portion is formed along an outer periphery face of the spacer 58. O-ring as a seal member 59 is fitted to the recessed portion formed along the outer periphery face of the spacer 58.

Such an apparatus side terminal 50 is inserted into the apparatus side housing 30 from the below. The inserted apparatus side terminal 50 is held in the apparatus side housing 30 in a state of preventing disengagement (drop) by engaging and stopping the lance hole 56 in the lance 36. In this state, the female connection part 53 is accommodated inside the cavity 35 of the cylinder part 31 and also the board 52 penetrates the communication space 43 of the joint part 32 and is located in the front of the arc wall 33. At this time, the lower end of the board 52 is located slightly upward from the lower end of the arc wall 33. Also, the spacer 58 abuts on the seal surface 44 over the entire circumference and by this abutment, free movement or rattle in backward and forward horizontal directions with respect to the seal surface 44 is regulated in the seal member 59 fastened to the board 52. Therefore, the seal member 59 is held in a state of making close contact with the seal surface 44 uniformly over the entire circumference.

The retainer 60 is made of synthetic resin and is obtained by integrally molding an upper surface wall 61 and four wall parts 65, 67 extending in parallel mutually and perpendicularly downward from a lower surface of this upper surface wall 61.

Three notch parts 62 opened backward are horizontally arranged and formed in the upper surface wall 61 at the same pitch as that of the cylinder parts 31 of the apparatus side housing 30. The back end (front end) of the notch part 62 has a semicircle part 63, and the center of a circular arc of this semicircle part 63 is located in the substantially center of the upper surface wall 61 in backward and forward directions, and a curvature radius of the semicircle part 63 is set to the same dimension as a curvature radius of the mounting groove 42 of the apparatus side housing 30. Also, a region ranging from the semicircle part 63 of the notch part 62 to the back edge of the upper surface wall 61 is formed in a constant width part 64 which has a width of the same dimension as a diameter of the semicircle part 63 and makes this width dimension constant in backward and forward directions.

The four wall parts 65, 67 are formed in substantially flat plate shape along both the right and left side edges of the constant width part 64 and also rectangular shape when viewed from the side, and a formation range in backward and forward directions of the wall parts 65, 67 ranges from the front edge to the back edge of the upper surface wall 61.

The two central wall parts among the four wall parts 65, 67 is configured as partition walls 65 (a partition part, a guide part and a rotation stop part which are configuration requirements of the invention) for partitioning a range among the three notch parts 62. In the partition wall 65, the substantially lower half is wider than the substantially upper half and the boundary is formed in stepped shape in both the right and left sides. Also, a flexible engagement stop segment 66 of a form extending in cantilever shape forward from the back end of the partition wall 65 and along the outside (that is, the side facing the notch parts 62 located in both the right and left sides) opposite to the partition wall 65 of the other side each other is formed in the upper end of the partition wall 65. This flexible engagement stop segment 66 enables elastic flexure in a horizontal direction and an engagement stop protrusion 66a is formed in the extension end (front end).

Figure 18:
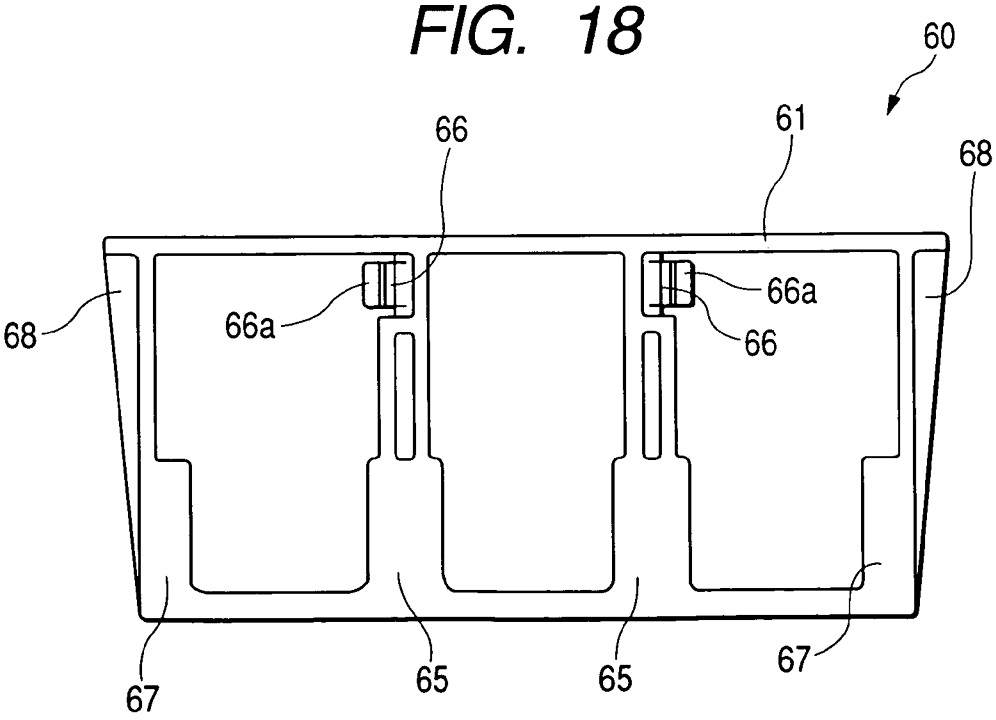
FIG. 18 is a front view of the retainer of another example.

The two wall parts located in both the right and left ends among the four wall parts 65, 67 is configured as protective walls 67 (a guide part and a rotation stop part which are configuration requirements of the invention). The protective walls 67 are placed in a state shifted near to the center slightly from both the right and left edges of the upper surface wall 61 and reinforcing ribs 68 are extended downward along the outsides of the protective walls 67 from lower surfaces of both the right and left ends of the upper surface wall 61 outward overhung from the protective walls 67 by this position shift. Also, in the protective wall 67, the substantially lower half is wider than the substantially upper half and the boundary is formed in stepped shape in the inner side (side opposite to the reinforcing rib 68). FIG. 18 is a front view of the retainer of another example. In FIG. 18, the retainer 60 may be formed by connecting the four walls 65, 67 in a lower portion of the upper surface wall 61, so that the strength of the rotation stop part can be increased.

Next, action of the embodiment will be described.

In the case of mounting the connector A for apparatus of the embodiment in the apparatus 70, the apparatus side connector C is first assembled in the shielding case 71. In the case of the assembly, the apparatus side housing 30 is fitted so as to be dropped into the mounting hole 72 from the above (from the outside of the shielding case 71). The fitted apparatus side housing 30 is forward stopped, that is, downward displacement (drop) is regulated by abutting the engagement stop rib 37 on the stopper 73 from the above. In this state, the mounting groove 42 of the lower end of the joint part 32 penetrates the mounting hole 72 and is located downward slightly from a lower surface (inner surface) of the shielding case 71 and also the arc wall 33 penetrates the mounting hole 72 and is located inside the shielding case 71.

Thereafter, the retainer 60 is assembled to the apparatus side housing 30 from the front (the above in FIG. 4, the right in FIG. 6) in the inside of the shielding case 71. In the case of the assembly, while the upper surface wall 61 of the retainer 60 is brought into sliding contact with an inner surface (that is, a flat surface of a horizontal direction perpendicular to a fit direction of the apparatus side housing 30 to the mounting hole 72) of the shielding case 71, the notch parts 62 of the retainer 60 are fitted in the mounting grooves 42 of the apparatus side housing 30. At this time, the two partition walls 65 of the retainer 60 make sliding contact with both the right and left guide walls 45 of the apparatus side housing 30 so as to pinch the guide walls 45 from both the right and left sides and thereby, the retainer 60 is guided in right and left directions. As a result of this, the retainer 60 is assembled in the apparatus side housing 30 while keeping a normal attitude.

In a process of assembling the retainer 60, the flexible engagement stop segment 66 makes sliding contact with the auxiliary wall 46 while flexing elastically in order to interfere with auxiliary wall 46. Then, when the retainer 60 is assembled to a normal position, the semicircle part 63 of the notch part 62 abuts on the mounting groove 42 from the front and results in a fit state and also, the flexible engagement stop segment 66 returns elastically and the engagement stop protrusion **66*a* is engaged and stopped to the retaining part 47 from the back and thereby in the retainer 60, large free movement in backward and forward directions with respect to the apparatus side housing 30 is regulated. Also, the notch part 62 fits in the mounting groove 42 and thereby, large free movement in a vertical direction and free movement in a horizontal direction of the retainer 60 with respect to the apparatus side housing 30** are regulated.

In a state in which the retainer 60 is assembled in the apparatus side housing 30, the upper surface wall 61 abuts on the shielding case 71 from the below, so that a situation in which the retainer 60 and the apparatus side housing 30 freely move largely upward with respect to the shielding case 71 is regulated. As a result of this, the apparatus side housing 30 is mounted in a state in which dismounting is regulated with respect to the shielding case 71.

Incidentally, slight clearance 36 (not shown) in which the apparatus side housing 30 is allowed to be displaced relatively in vertical and horizontal directions inside the mounting hole 72 is provided between an inner circumference of the mounting hole 72 and the apparatus side housing 30. Also slight clearance 36 (not shown) in which the apparatus side housing 30 is allowed to be displaced relatively to the shielding case 71 is provided between the retainer 60 and the apparatus side housing 30 and between the retainer 60 and the shielding case 71.

Also, in a state in which the retainer 60 is assembled in the apparatus side housing 30, the apparatus direct connection terminal 75 is accommodated inside space between the protective wall 67 and the partition wall 65 or space between the mutual partition walls 65. Here, a horizontal width dimension of the apparatus direct connection terminal 75 is the same dimension as distance between the protective wall 67 and the partition wall 65 and distance between the mutual partition walls 65, and the horizontal part **75*a* of the apparatus direct connection terminal 75 is pinched between these walls 65, 67. Therefore, free movement in a horizontal direction of the apparatus direct connection terminal 75, that is, rotation about a bolt hole (not shown) in which an axis line is set in backward and forward direction of the upper end of the apparatus direct connection terminal 75 is regulated. In other words, the partition wall 65 and the protective wall 67** also serve as a rotation stop part of the invention.

Also, the lower end located in the front of the arc walls 33 of the apparatus side terminal 50 is in a state exposed to the front outside of the apparatus side housing 30, and there is nothing to cover the mutual lower ends of the horizontally adjacent apparatus side terminals 50 in a state in which the retainer 60 is not assembled in the apparatus side housing 30. However, by assembling the retainer 60, the partition wall 65 is interposed between the mutual lower ends of the apparatus side terminals 50 and the mutual lower ends of the apparatus side terminals 50 are separated by the partition wall 65. Similarly, the apparatus direct connection terminal 75 is accommodated inside the space between the protective wall 67 and the partition wall 65 or the space between the mutual partition walls 65, so that space between the horizontally adjacent apparatus direct connection terminals 75 is separated by the partition wall 65.

In a state in which the apparatus side housing 30 is assembled in the shielding case 71 thus, the vertical part 75*b* of each the apparatus direct connection terminal 75 abuts or approaches and is opposed to the front of the board 52 of each the corresponding apparatus side terminal 50, respectively and a bolt hole of the apparatus direct connection terminal 75 concentrically corresponds to the female thread body 55 of the apparatus side terminal 50. In this state, when a bolt 76 is penetrated in the bolt hole of the apparatus direct connection terminal 75 from the front and is screwed and tightened into the female thread body 55, the apparatus side terminal 50 is connected to the apparatus direct connection terminal 75. Now, in the case of tightening of the bolt 76, an impact wrench (jig) which is not shown is used, and mutually corresponding surfaces of the protective wall 67 and the partition wall 65 and mutually corresponding surfaces of the mutual partition walls 65 are configured as a guide part for guiding the impact wrench to a head of the bolt 76 by pinching the impact wrench from the right and left.

Thereafter, the electric wire side connector B is assembled from the outside (above) of the shielding case 71 and is fitted in the apparatus side connector C. In the case of the fitting, each the fitting part 12 is fitted into the mounting hole 72 and is fitted so as to cover the corresponding cylinder part 31. Then, the male connection part 22 of the apparatus side terminal 50 is inserted into the cylinder part 31 and moves into the female connection part 53 of the apparatus side terminal 50 and the elastic contact segment 57 makes elastic contact with the male connection part 22. As a result of this, the electric wire side terminals 20 are connected to the apparatus side terminals 50.

Also, the electric wire side connector B is fixed in the outside of the shielding case 71 by screwing and tightening a bolt 19 inserted into the bolt hole 16 of the electric wire side housing 10 and the shielding shell 27 into the female threaded hole 74 of the shielding case 71. Also, the shielding shell 27 is conductibly connected to the shielding case 71.

Also, in a state in which the connector A for apparatus is mounted in the apparatus 70, space between the mounting hole 72 and the apparatus side connector C is made waterproof by the seal ring 39 attached to an outer circumference of the apparatus side housing 30, and space between the electric wire side connector B and the mounting hole 72 is made waterproof by the seal ring 14 attached to an outer circumference of the fitting part 12. Therefore, there is no fear that liquid of the outside of the shielding case 71 passes through the mounting hole 72 and infiltrates into the shielding case 71 and also there is no fear that oil inside the shielding case 71 passes through the mounting hole 72 and leaks outside the shielding case 71. Also, a situation in which water infiltrates into a fit portion between the electric wire side connector B and the apparatus side connector C from the outside of the shielding case 71 is prevented by the two seal rings 14, 39.

Also, since the inside of the apparatus side housing 30 faces the inside of the shielding case 71, there is a fear that oil inside the shielding case 71 passes through a gap between the apparatus side housing 30 and the apparatus side terminal 50 and infiltrates in to a connection portion between the electric wire side terminal 20 and the apparatus side terminal 50 and further passes through a gap between the electric wire side housing 10 and the electric wire side terminal 20 and infiltrates into the electric wire 24, but in the embodiment, the seal member 59 is attached to an outer circumference of the apparatus side terminal 50, so that there is no fear of infiltration of oil into the connection portion between the mutual terminals 20 and 50.

As described above, in the embodiment, connection and disconnection between the apparatus 70 and the electric wire 24 are made by a connector structure in which the electric wire side housing 10 is fitted in or removed from the apparatus side housing 30 inside the mounting hole 72, so that the need for time-consuming work for tightening mutual terminals by a bolt or loosening the bolt or work for attaching a cover to a terminal block or detaching the cover from the terminal block as is conventional is eliminated and workability is good.

In addition, the apparatus side housing 30 can be fixed into the mounting hole 72 by abutment on the stopper 73 and assembly of the retainer 60, so that workability is good as compared with the case of fixing the apparatus side housing by bolt tightening.

Also, since the partition wall 65 is provided in the retainer 60 as a partition part for partitioning a portion between the lower ends exposed to the outside of the apparatus side housing 30 among the three parallel apparatus side terminals 50, it is constructed so that by this partition wall 65, creepage distance between the horizontally adjacent apparatus side terminals 50 and creepage distance between the horizontally adjacent apparatus direct connection terminals 75 are ensured and leakage between the apparatus side terminals 50 can be prevented.

Also, an impact wrench which is a jig for bolt tightening for making connection between the apparatus side terminals 50 and the apparatus direct connection terminals 75 is guided to a bolt tightening part of the apparatus side terminals 50 by the protective wall 67 or the partition wall 65 acting as a guide part, so that workability of bolt tightening is good.

Also, since the protective wall 67 or the partition wall 65 acting as a rotation stop part for pinching the apparatus direct connection terminals 75 from both sides is provided in the retainer 60, the apparatus direct connection terminals 75 can be prevented from dragging in the case of bolt tightening.

Also, for example, in the case that the apparatus side housing 30 is fixed in the case when the apparatus direct connection terminals 75 and the apparatus side terminals 50 are displaced relatively to the shielding case 71 due to vibration etc. in travel, there is a fear of increase or concentration of stress in a portion of abutment on an inner circumference of the mounting hole 72 or a holding portion of the apparatus side terminals 50 in the apparatus side housing 30. However, according to the embodiment, clearance 36 in which the apparatus side housing 30 is allowed to be displaced relatively inside the mounting hole 72 is provided between an inner circumference of the mounting hole 72 and the apparatus side housing 30 and also, clearance 36 in which the apparatus side housing 30 is allowed to be displaced relatively to the case is provided between the retainer 60 and the apparatus side housing 30 and between the retainer 60 and the shielding case 71. As a result of this, it is constructed so that the apparatus side housing 30 can be displaced relatively to the shielding case 71 integrally with the apparatus side terminals 50 and the apparatus direct connection terminals 75, and increase or concentration of stress in the apparatus side housing 30 is avoided.

The invention is not limited to the embodiment explained by the description and the drawings described above and, for example, the following embodiments are also included in technical scope of the invention and further various changes can be made without departing from the subject matter in addition to the following.

(1) In the embodiment, the retainer has been provided inside the case, but according to the invention, the retainer may be provided outside the case.

(2) In the embodiment, the stopper of the case side has been provided in the inside of the mounting hole, but according to the invention, the stopper may be provided in the outside of the mounting hole, that is, an inner surface or an outer surface of the case.

(3) In the embodiment, the apparatus side housing has been constructed so as to be inserted into the mounting hole from the outside of the case, but according to the invention, the apparatus side housing may be constructed so as to be inserted into the mounting hole from the inside of the case.

(4) In the embodiment, the case that a conductive path by the electric wire is shielded has been described, but the invention can also be applied to the case that a conductive path made of the electric wire cannot be shielded.

(5) In the embodiment, a fit direction of the retainer with respect to the apparatus side housing has been set in a direction intersecting an insertion direction of the apparatus side housing with respect to the mounting hole, but according to the invention, the fit direction of the retainer may be set in a direction parallel to the insertion direction of the apparatus side housing with respect to the mounting hole.

(6) In the embodiment, plural apparatus side terminals have been collectively held in one apparatus side housing, but according to the invention, it may be constructed so that only one apparatus side terminal is held in one apparatus side housing. In this case, plural apparatus side housings may be collectively retained by one retainer or each the apparatus side housing may be individually retained by the retainer.

(7) In the embodiment, the apparatus side housing can be displaced relatively to the case by the retainer, but according to the invention, it may be constructed so that the apparatus side housing can be displaced relatively to the case without using the retainer.

(8) In the embodiment, clearances has been provided between the retainer and the apparatus side housing and between the retainer and the case. Accordingly, the apparatus side housing can be displaced relatively to the case, but according to the invention, only any one of the clearance between the retainer and the apparatus side housing and the clearance between the retainer and the case may be provided.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A connector for an apparatus comprising:

an apparatus case having a mounting hole and a stopper;

an apparatus side housing inserted into the mounting hole of the apparatus case in an insertion direction, and holding at least one apparatus side terminal; and an electric wire side housing capable of being fitted in the apparatus side housing in the insertion direction, and holding at least one electric wire side terminal fastened to an distal end of an electric wire, wherein the at least one electric wire side terminal is capable of being connected to or disconnected from the at least one apparatus side terminal by fitting or removing the electric wire side housing from the apparatus side housing, the apparatus side housing is forward stopped by abutting on the stopper of the apparatus case, and the apparatus side housing is retained by engaging and stopping a retainer fitted in the apparatus side housing in the apparatus case.

2. A connector for an apparatus according to claim 1, wherein the retainer has a partition part which separates a plurality of parallel apparatus side terminal regions exposed to an outside of the apparatus side housing.

3. A connector for an apparatus according to claim 1, wherein an apparatus direct connection terminal which is directly connected to an apparatus main body inside the apparatus case is connected to the at least one apparatus side by tightening a bolt, and the retainer has at least one guide part which guides a jig used to tighten the bolt.

4. A connector for an apparatus according to claim 1, wherein an apparatus direct connection terminal which is directly connected to an apparatus main body inside the apparatus case is connected to the at least one apparatus side terminal by tightening a bolt, and the retainer has at least one rotation stop part which pinches the at least one apparatus direct connection terminal from both sides of the at least one rotation stop part.

5. A connector for an apparatus according to claim 1, wherein at least one apparatus direct connection terminal is directly connected to an apparatus main body inside the apparatus case, the at least one apparatus side terminal is fixed to the at least one apparatus direct connection terminal, the at least one apparatus direct connection terminal is displaceable relatively to the apparatus case, clearance which allows the apparatus side housing to be displaced relatively inside the mounting hole is provided between the apparatus side housing and an inner circumference of the mounting hole, and clearance which allows the apparatus side housing to be displaced relatively to the apparatus case is provided at least between the retainer and the apparatus side housing and between the retainer and the apparatus case.

* * * * *